United States Patent
Haley et al.

(10) Patent No.: US 7,782,796 B2
(45) Date of Patent: Aug. 24, 2010

(54) METHOD FOR GENERATING AN ANNOTATED NETWORK TOPOLOGY

(75) Inventors: Michael R. Haley, South Salem, NY (US); Prashant Pradhan, New Rochelle, NY (US); Debanjan Saha, Mohegan Lake, NY (US); Sambit Sahu, Hopewell Junction, NY (US); Manpreet Singh, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/204,856

(22) Filed: Aug. 16, 2005

(65) Prior Publication Data

US 2007/0041317 A1    Feb. 22, 2007

(51) Int. Cl.
    H04L 12/28    (2006.01)
(52) U.S. Cl. ...................................... 370/254
(58) Field of Classification Search ................. 370/468, 370/254; 709/224, 233, 223
    See application file for complete search history.

(56) References Cited

U.S. PATENT DOCUMENTS

| | | | | |
|---|---|---|---|---|
| 6,560,243 | B1 * | 5/2003 | Mogul | 370/468 |
| 7,047,311 | B2 * | 5/2006 | Oishi et al. | 709/233 |
| 2003/0115319 | A1 * | 6/2003 | Dawson et al. | 709/224 |

\* cited by examiner

*Primary Examiner*—Derrick W Ferris
*Assistant Examiner*—Gbemileke Onamuti
(74) *Attorney, Agent, or Firm*—Michael J. Buchenhorner; Brian Verminsko (57) ABSTRACT

A method of generating an annotated network topology of a network is described. The method includes; deriving a network topology by performing a route tracing utility between each pair of endpoints to determine the route taken by packets; initially annotating each network path with an initial value; determining the available bandwidth of a path connecting a pair of endpoints by performing Transfer Control Protocol (TCP) flows between the pair of endpoints; identifying a bottleneck link in the network path, and annotating all edges to generate an annotated network topology wherein available bandwidth annotation of links inside the network is determined using end-to-end network measurements.

1 Claim, 11 Drawing Sheets

METHOD FOR GENERATING AN ANNOTATED NETWORK TOPOLOGY

BACKGROUND OF THE INVENTION

1. Field of the Invention

Aspects of the invention generally relate to methods and systems for generating an annotated network topology, and more particularly, for generating an annotated network topology between endpoints of a network using end-to-end measurements.

2. Description of the Related Art

Network performance and availability are determinants of an application's end-to-end performance and user experience. However, the distributed and decentralized nature of network resources makes performance management a difficult problem.

Some prior art methods and systems use latency annotation tools to determine network performance and availability.

Other related art methods and systems use topology-unaware bandwidth annotation tools. However, such methods and systems provide incorrect estimates of available bandwidth when path sharing occurs in the underlying topology. That is, sharing of paths is not taken into account in the related art methods and systems. In addition to inaccuracy, not accounting for sharing may lead to redundant probes when links fail.

On the other hand, some prior art methods and systems attempt to provide solutions for bottleneck identification on an individual path. However, monitoring traffic can be very intrusive to existing network traffic. Further, such prior art methods and systems use bottleneck identification tools that could flood the network.

Still other related art methods and systems use tools that require network device support (e.g., network router support). However, such tools can only be used by network operators (e.g., telecommunication companies) and/or on the subparts of the network owned by them. Thus, such related art methods would require an unrealistic assumption for most networks.

Therefore, there is a need to overcome the above-identified problems as such prior art tools are not viable for production usage.

SUMMARY OF THE INVENTION

In view of the foregoing and other exemplary problems, drawbacks, and disadvantages of the conventional methods and structures, an aspect of the invention provides a method for generating a network path annotation service. More particularly, an aspect of the invention relates to generating an annotated network topology between endpoints of a network using end-to-end measurements, in which the annotated network topology is annotated based on one or more of available bandwidth, latency, and loss rate.

Exemplary aspects of the present invention are directed to a method for generating a network path annotation service, and more particularly, for generating an annotated network topology between endpoints of a network using end-to-end measurements, in which the annotated network topology is annotated based on available bandwidth, latency, and loss rate.

In one aspect, a method of generating an annotated network topology of a network is described. The method includes determining available bandwidth "B" of a network on a network path connecting a pair of endpoints by performing Transfer Control Protocol (TCP) flows between the pair of endpoints, the network having a plurality of network paths, identifying a bottleneck link in the network path, and annotating all edges in a network path, wherein available bandwidth annotation of links inside the network and edge bandwidths is determined using end-to-end network measurements.

BRIEF DESCRIPTION OF THE DRAWINGS

The foregoing and other exemplary purposes, aspects and advantages will be better understood from the following detailed description of an exemplary embodiment of the invention with reference to the drawings, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF EXEMPLARY EMBODIMENTS OF THE INVENTION

Figure 1:
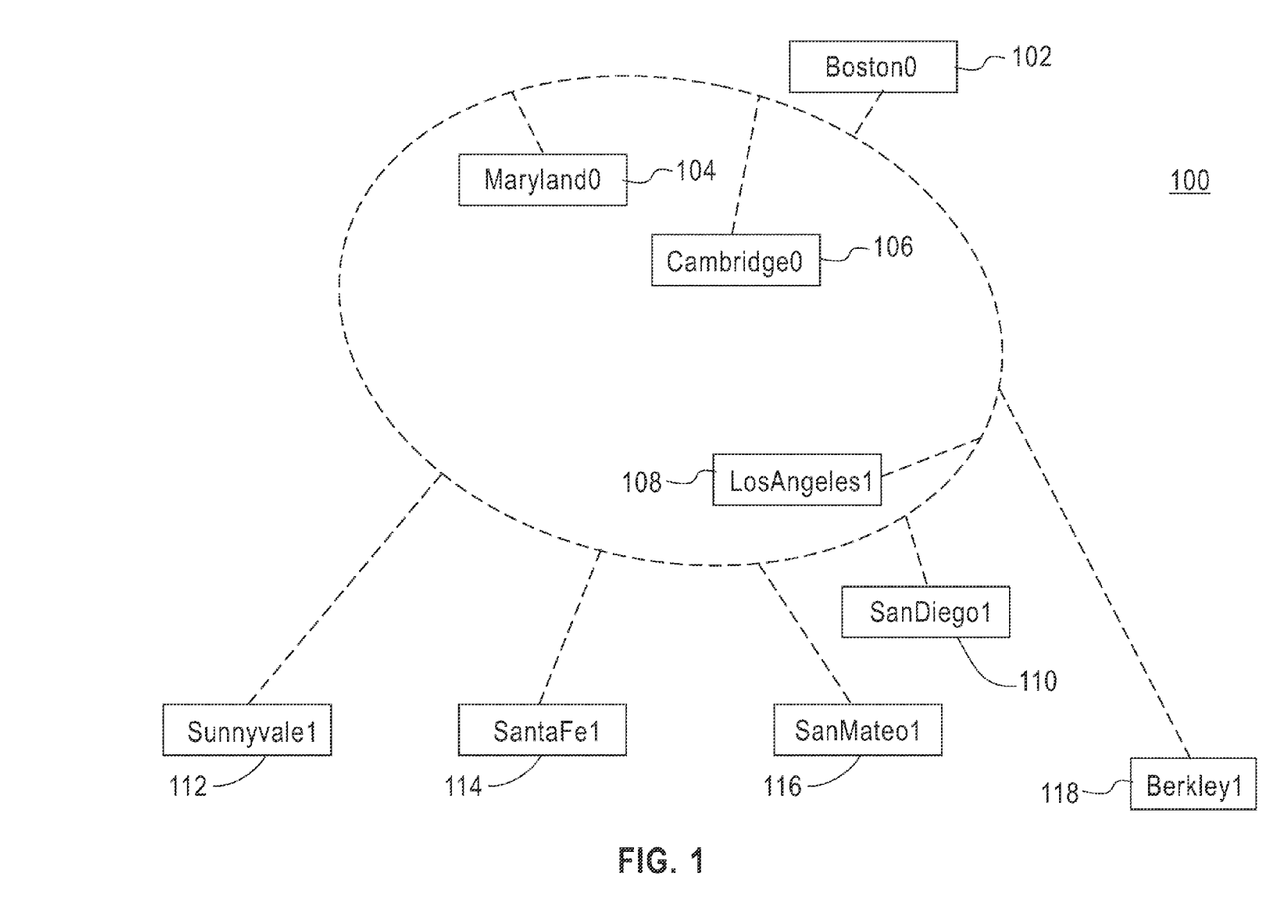
FIG. 1 illustrates a high level schematic of a set of network-connected hosts/machines to provide an annotated topology of a network connecting the hosts.

FIG. 1 illustrates an exemplary high-level network topology 100 to illustrate various aspects of the invention. The network topology 100 discloses a plurality of hub locations representing a set of end points 102, 104, 106, 108, 110, 112 in order to generate a topological map of a network. For example, for ease of illustration, the network topology 100 shows locations of network hubs in cities, states, universities, and so forth. The number of end points shown is merely for purpose of illustration. It will be appreciated that more or less number of end points can be used.

Figure 2:
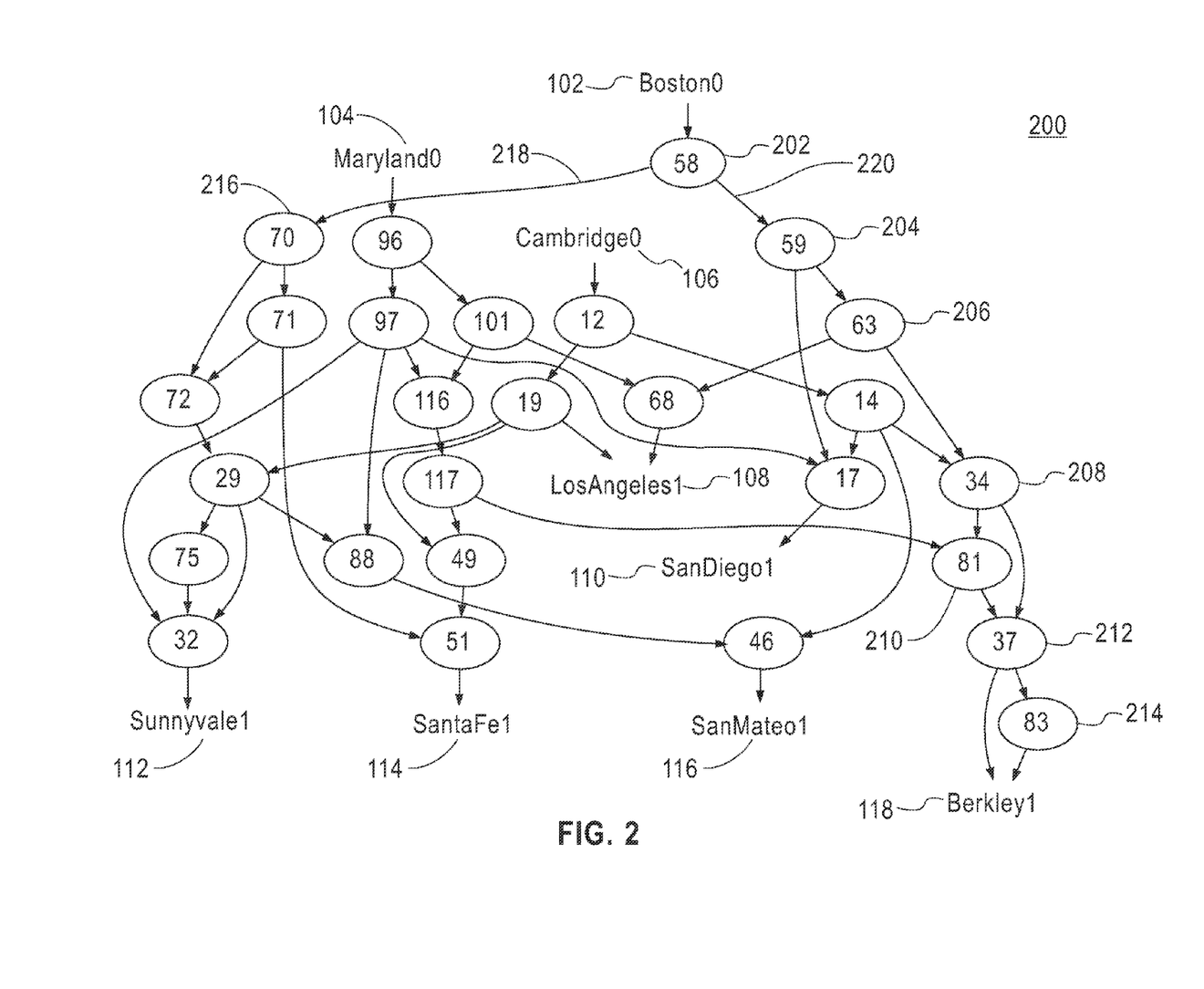
FIG. 2 illustrates an un-annotated network topology between network endpoints illustrated in FIG. 1.

FIG. 2 depicts an exemplary topological map 200 that can be derived from the network topology 100 as shown in FIG. 1 with given a set of endpoints 102, 104, 106, 108, 110, and 112 (e.g., hub locations in Maryland, Boston, Cambridge, San Diego, etc.). The topological map 200 or a view of the network connecting the endpoints 102-112 can be derived by connecting the endpoints 102-112 as illustrated in FIG. 2. The endpoints 102-112 are connected via nodes. For example, the network path connecting endpoints 102 and 118 includes nodes 202, 204, 206, 208, 210 and 214. A network edge connects each of the nodes to another node. For example, nodes 202 and 204 are connected via a network edge 220. Similarly, nodes 202 and 216 are connected via a network edge 218. The network edges 218 and 220 are alternatively referred to herein as internal edges as the edges are internal to the network 200. As illustrated in FIG. 2, each of the numbers shown within a node are node identifiers for that respective node.

Figure 3A:
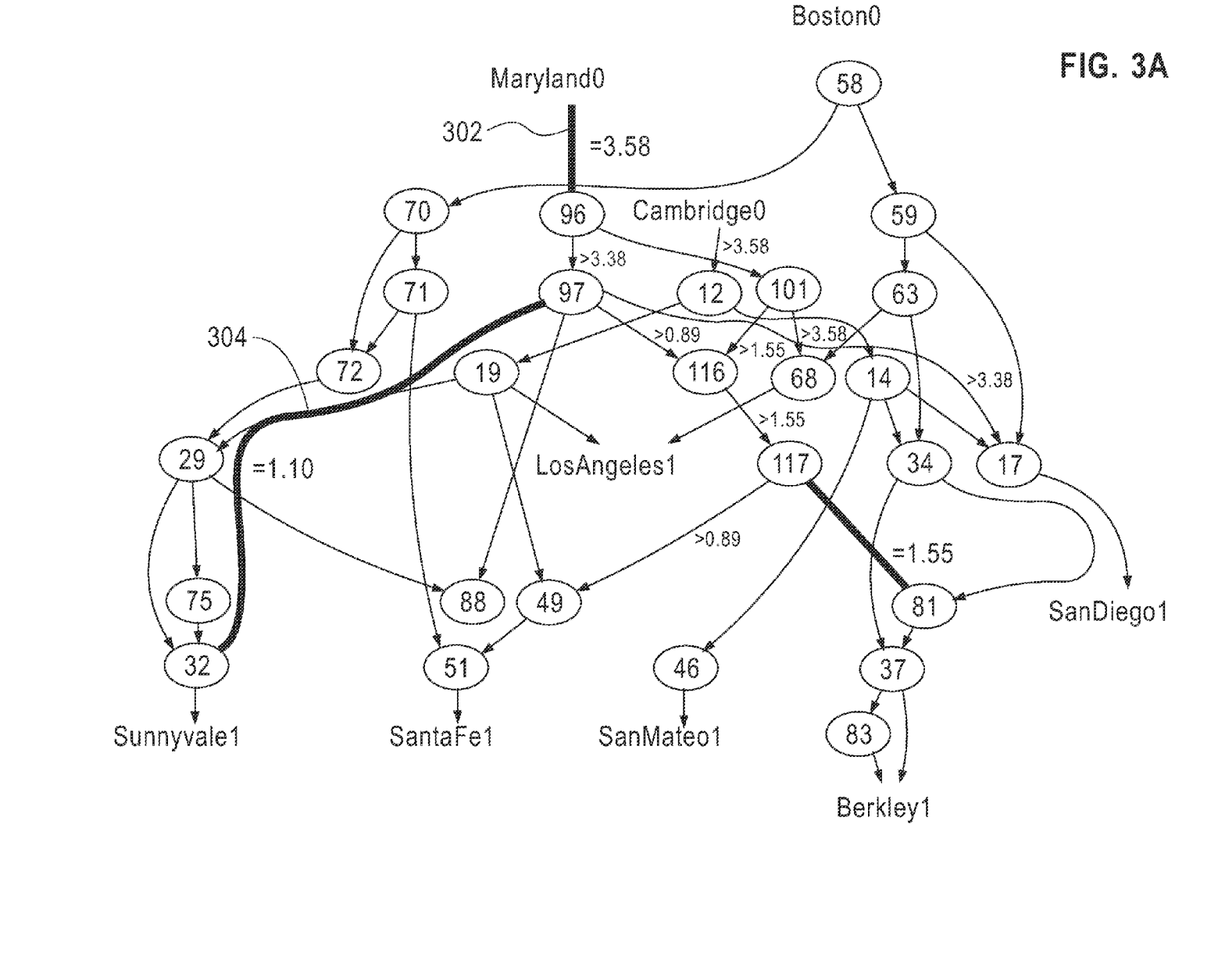
FIGS. 3(A)-3(B) illustrate exemplary steps of annotating each of the network links in the network topology shown in FIG. 2.
Figure 3B:
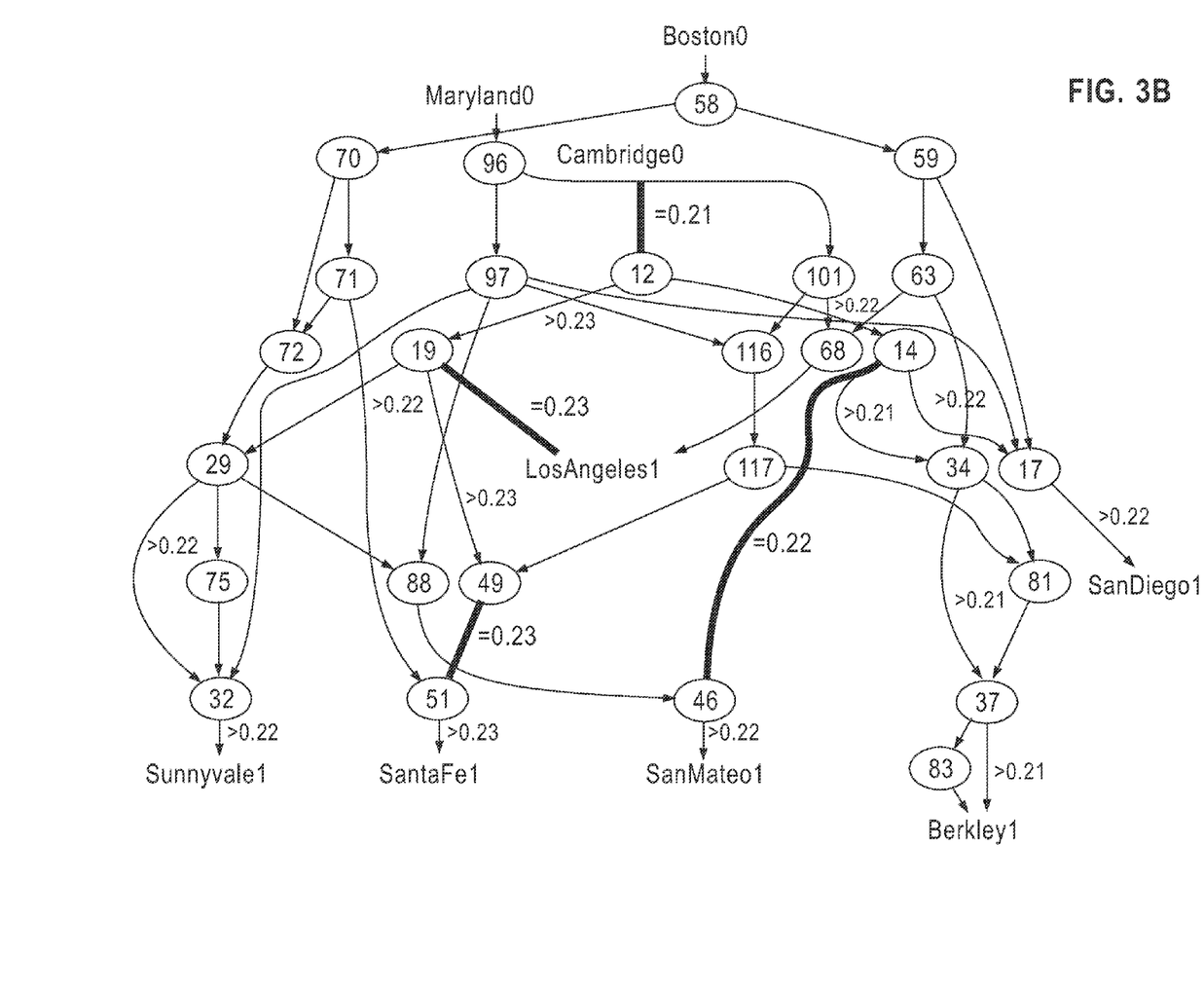

FIGS. 3A-3B illustrate various ways of annotating the topological network 200 shown in FIG. 2. For example, the topological view 200 can be annotated using available bandwidth, delay, and loss rates in various parts of the network.

As illustrated in FIGS. 3(A)-3(B), routing constraints between pairs of end points preferably are captured by creating a topological map (e.g., an Internet Protocol (IP) level topological map) of the network. The topological map of the network preferably includes constraints on routing and exposes path sharing, which are beneficial for capturing constraints on packing an application's bandwidth demand within the network capacity. Also, the edges of the resulting topological map are annotated with latency and available bandwidth.

Continuing to refer to FIGS. 3(A)-3(B), at each step, a network link may be annotated with an equality (=), representing that the link has been annotated, or an inequality (>), representing that the link's annotation could be further refined using subsequent steps in the algorithm. An equality can result when the link was fully saturated in some measurement step in the algorithm. Inequalities can indicate that the link has not been fully saturated during any measurement, and hence more capacity in the link could be available.

As an example, in FIG. 3A, network links 302, 304 which are marked bold indicate the edges whose annotation has been finalized in that step of the algorithm. For example, the edge 302 connected to the node marked "Maryland0" is annotated with 3.58, which indicates that the available bandwidth on the edge 302 is known to be 3.58 Megabits per second, and that annotation of the edge 302 has been finalized. Other edges, which are either unmarked, or annotated with inequalities, represent edges whose annotation can be further refined by subsequent steps of the methodology.

Figure 4:
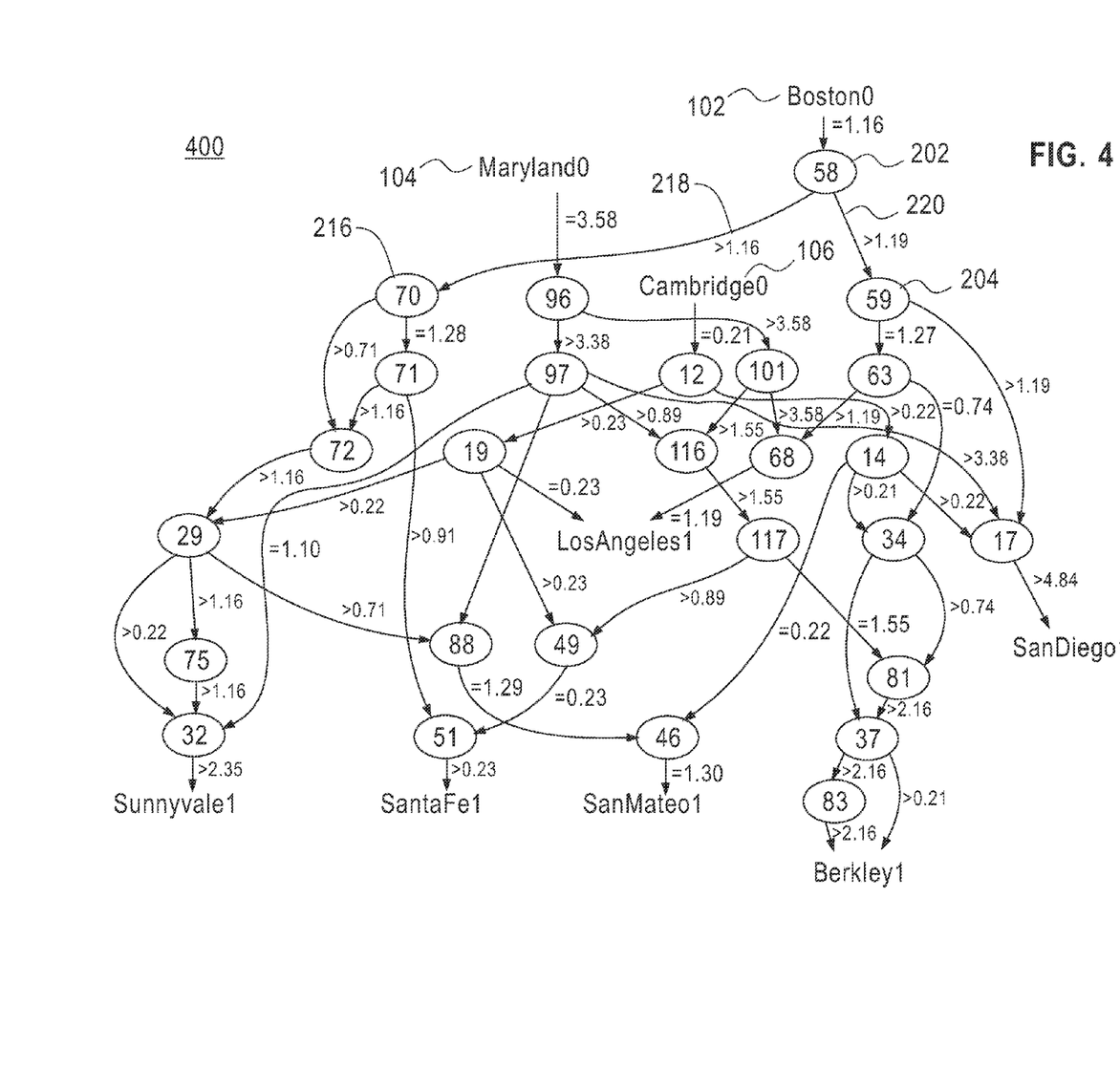
FIG. 4 illustrates an exemplary annotated network topology.

FIG. 4 shows a map of a network 400 wherein each of the internal edges 218 and 220 of the graphs are annotated with the available bandwidth.

As shown in FIG. 4, the final annotation of the network, at the end of the algorithm's execution, could include both equalities (=) and inequalities (>). The final state of the network represents the maximum information that can be derived about the network's annotation from end-to-end measurements.

As referred to herein, an end-to-end measurement is defined as a measurement between two network endpoints. Endpoints are further defined as machines (e.g., devices, systems, apparatus) that connect to a network and use the network to communicate with other machines, as opposed to network routers and switches, which are used in a network to forward data between machines.

Bandwidth annotation is generally used to express capacity constraints and latency annotation is used to express performance constraints. For example, latency annotation can be obtained using per-hop delays reported by tracing a route using standard Internet utilities like "traceroute".

As described herein, the term "available bandwidth" defines the amount of bandwidth that an application can get by opening one or more Transmission Control Protocol (TCP) flows. Available bandwidth as described herein is different from raw bandwidth of a link, or bandwidth obtained by a User Datagram Protocol (UDP) flow.

In another exemplary aspect, the present invention is capable of efficiently obtaining the annotations (e.g., deriving the annotations) purely from end points of the network. For example, by conducting experiments between agents that run on the end points, it would be possible to derive internal information about the network (e.g., internal link, available bandwidth at a link, locations of bottlenecks, etc.) using end-to-end measurements. Thus, the exemplary aspects of the present invention are capable of annotating the network using end-to-end measurements.

Figure 5:
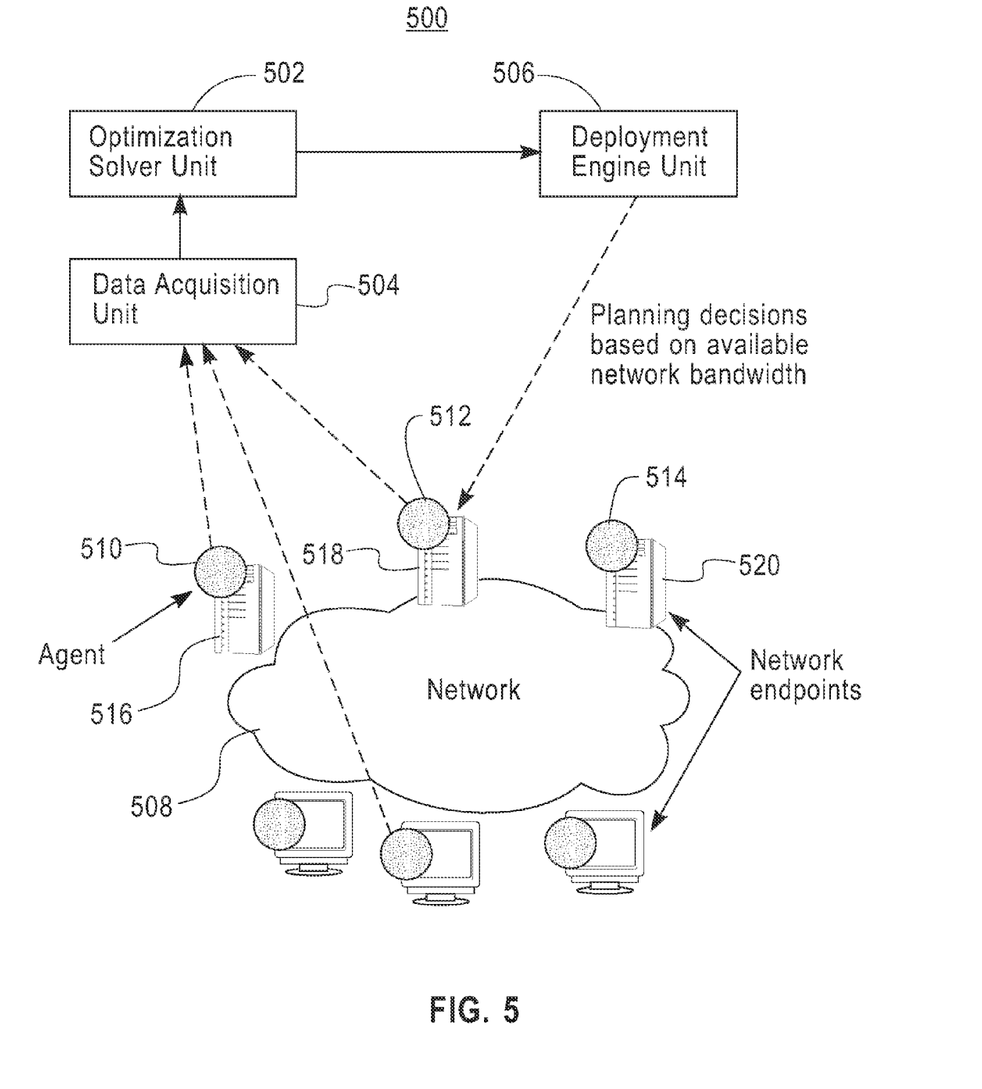
FIG. 5 illustrates an implementation architecture in accordance with an exemplary embodiment of the present invention.

FIG. 5 shows a high-level architectural schematic of a network performance management service 500 in accordance with an embodiment of the present invention. The management service 500 includes an optimization solver unit 502, a data acquisition unit 504, a deployment engine unit 506, a network 508 having a plurality of agents 510, 512, 514, and a plurality of network end points 516, 518, 520. Respective agents are configured to operate on respective network end points. For example, agent 510 is configured to operate on network end point 516 and agent 512 is configured to operate on network end point 518, and so on and so forth. An algorithm (e.g., intelligent algorithm) can be used to orchestrate experiments between the agents (e.g., 510, 512, 514) to determine the annotation.

Continuing to refer to FIG. 5, the data acquisition unit 504 (e.g., a centralized coordinator or controller) is preferably employed to execute an algorithm which can intelligently orchestrate experiments between network endpoints (e.g., 516, 518, 520) to arrive at an annotated view of the network. In one embodiment, the algorithm can be the methodology illustrated in FIGS. 6A and 6B. The data acquisition unit 504 is capable of orchestrating experiments between the network end points 516, 518, 520 to successfully find the view of the network between the network end points and also a complete annotated view of the network.

The data acquisition unit 504 is configured to monitor and collect data from the agents (e.g., 510, 512, 514) to create the annotated graph between the network endpoints 516, 518, 520. The collected data is input to the optimization solver unit 502 to determine an appropriate setting to meet the application's performance requirement. The optimization solver unit 502 may utilize one of several known optimization algorithms to determine the appropriate setting. For example, algorithms for solving combinatorial optimization problems can be used. The determined settings are converted (e.g., by the deployment engine unit 506), for example, to Extensible Mark-up Language (XML) configuration files and sent to the plurality of agents (510, 512, 414) for carrying out any required local configuration/control actions.

Figure 6A:
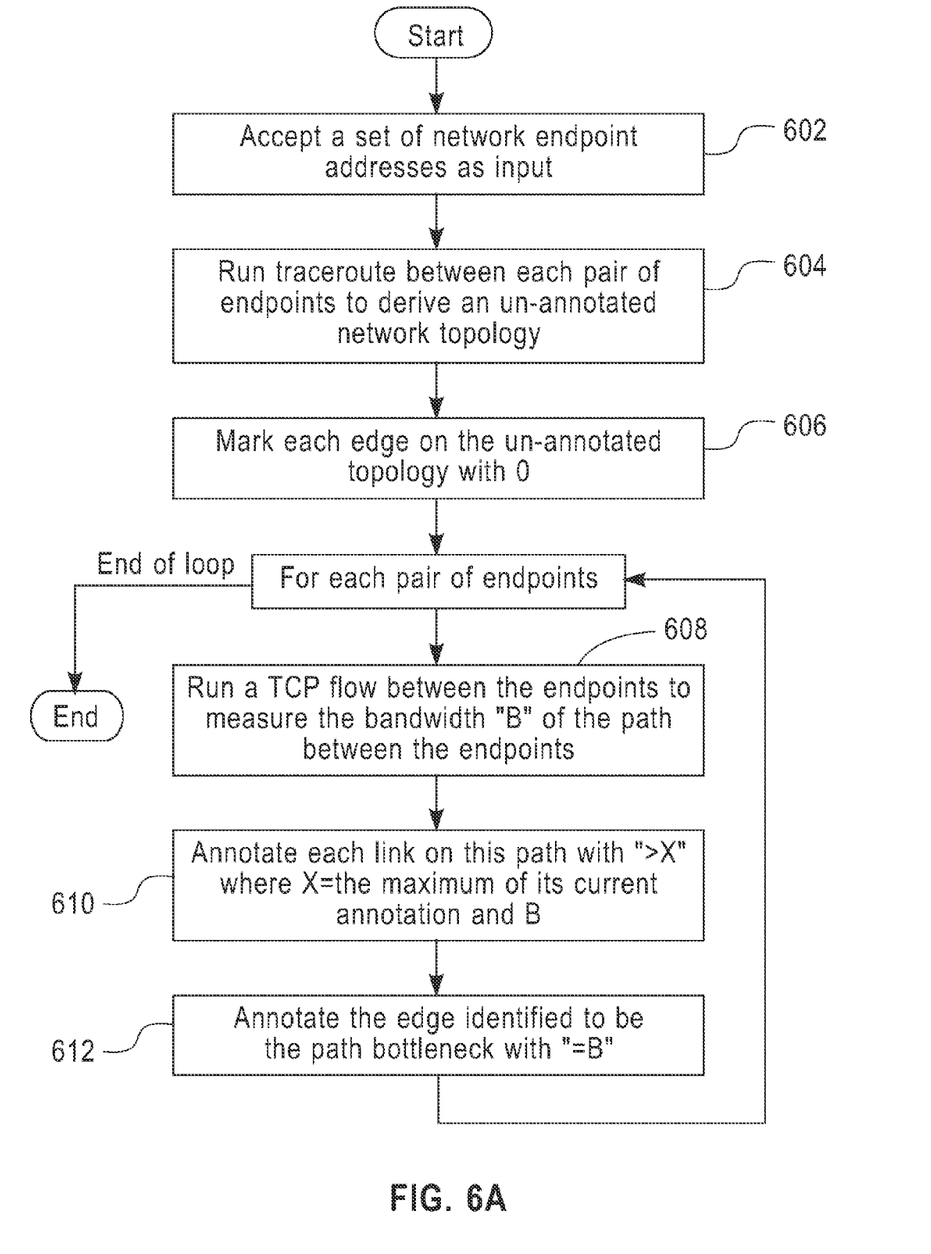
FIGS. 6A and 6B illustrate a methodology used in accordance with various embodiments of the present invention.

FIG. 6A shows a flowchart disclosing the methodology used in a pre-processing stage for determining annotated network topology between endpoints of a network in accordance with an embodiment of the invention.

At a step 602, a set of network endpoint addresses, are received as an input, for which it is desired to obtain an annotated network topology. The method then proceeds to step 604.

At a step 604, a route tracing utility (e.g., traceroute) is performed to determine an un-annotated network topology between each pair of the endpoints. The method then proceeds to step 606.

At a step 606, initial annotation of each edge in the un-annotated topology is set to be zero. The method then proceeds to step 608.

At a step 608, for each pair of the endpoints, a TCP flow is performed between each pair of endpoints in order to determine the available bandwidth "B" on a network path connecting the endpoints. The method then proceeds to step 610.

At a step 610, each link/edge in the network path identified in step 610 is annotated with the maximum of the available bandwidth "B" and the edge's current annotation. The method then proceeds to step 612.

At a step 612, the edge identified to be the path bottleneck is annotated with the maximum available bandwidth "B". Steps 608 through 612 are repeated for each pair of the endpoints.

Figure 7:
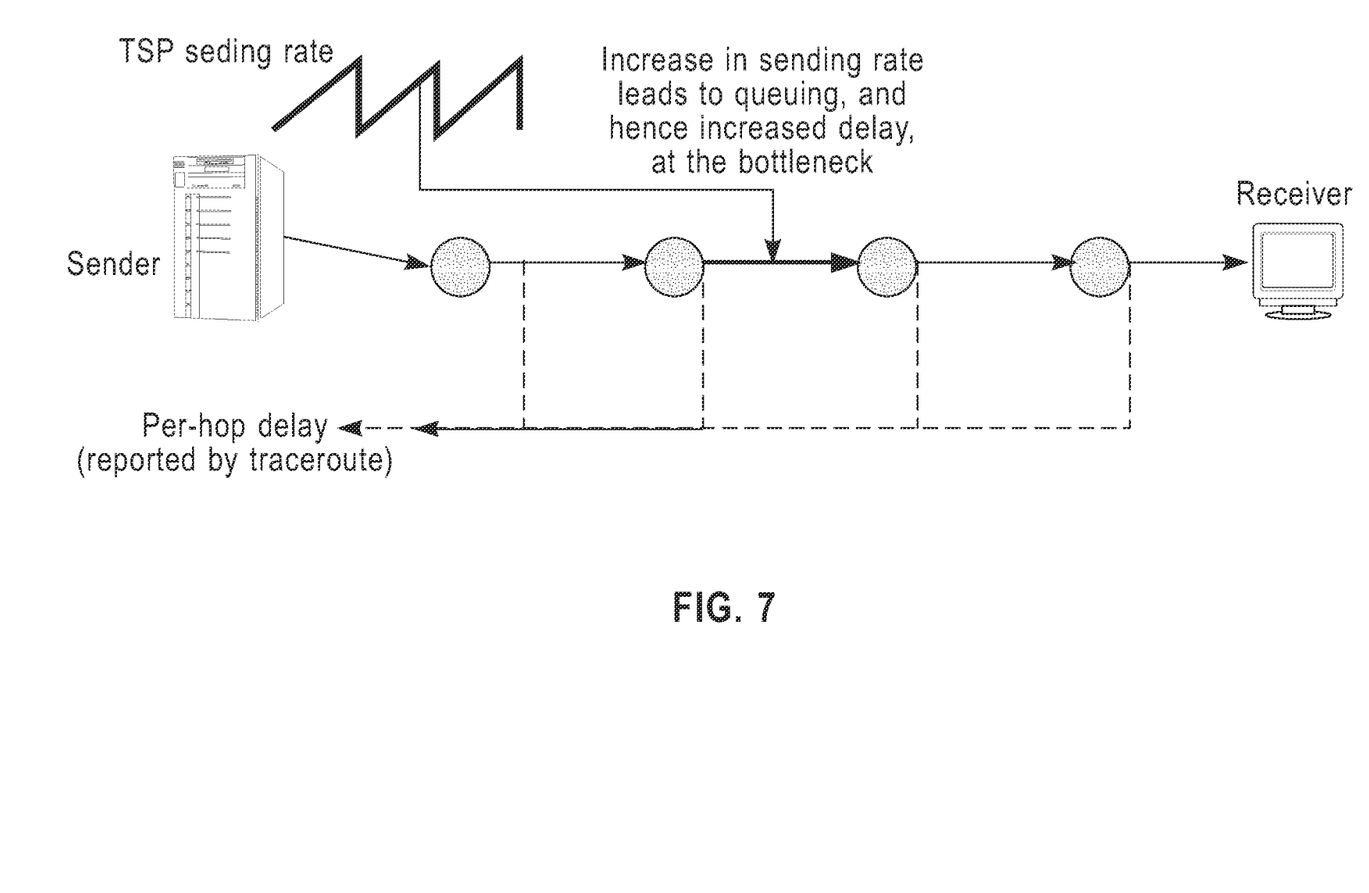
FIG. 7 illustrates a methodology for detecting a bottleneck link in a network path illustrated in FIG. 1.

Bottleneck identification is a primitive used by various aspects of the invention. Bottleneck identification is a method to identify which link on a network path has the least available bandwidth. Such method determines how much bandwidth is available on the entire network path. A feature of the invention is the identification of a bottleneck link on a network path without perturbing other traffic sharing the same path. This method of identifying bottlenecks works in conjunction with the TCP protocol, and is illustrated in FIG. 7.

Figure 6B:
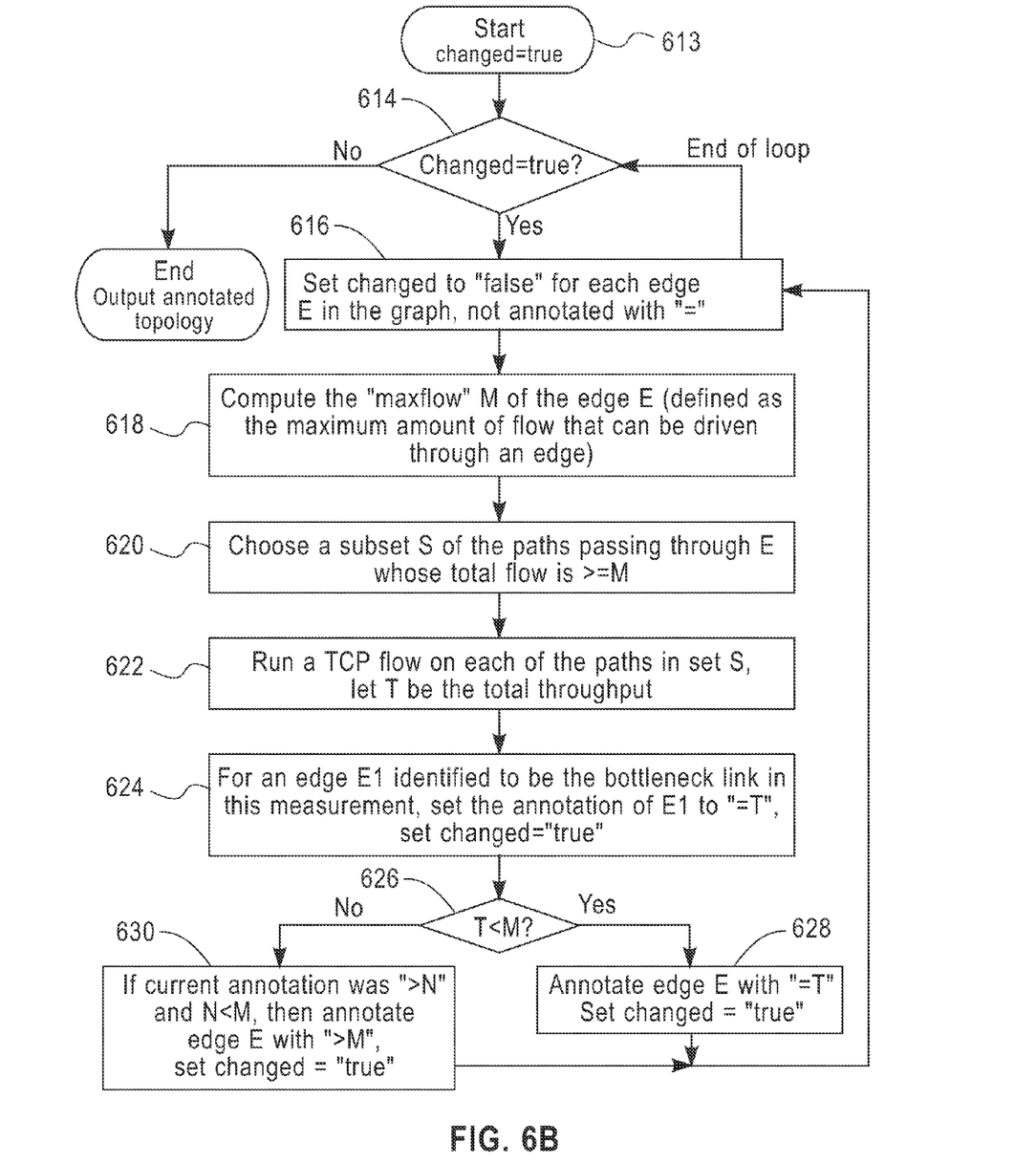

FIG. 6B shows a flowchart disclosing the methodology used in a recursive stage for determining annotated network topology between endpoints of a network in accordance with an embodiment of the invention. In the methodology illustrated in FIG. 6B, annotation of the network topology obtained in the pre-processing stage is further refined until a point where it is no longer possible to further refine the network's annotation.

The methodology starts at the innermost loop, as illustrated in FIG. 6B, and iterates over all the edges in the graph to determine if annotation of any edge can be further refined. If it is determined that annotation of an edge can be further refined, then the variable "changed" is set to true at step 613. The method then proceeds to step 614.

At a step 614, an inquiry is made to determine if the variable is changed to "true" or not. If the variable is changed to true, the method proceeds to step 616. Otherwise the method terminates when an iteration over all edges does not change the annotation of any edge.

At a step 616, if the annotation of an edge cannot be further refined, then the variable is set to "false." The method then proceeds to step 618.

At a step 618, for each edge E that has an annotation of an inequality (">"), the amount of data that can be sent through a respective edge E is determined given the various edges that feed into the respective edge E. Such determination is herein defined as "maxflow computation" and alternatively referred as "maxflow" (M). The method then proceeds to step 620.

At a step 620, given the maxflow M, a subset of paths S that pass through edge E is chosen such that the bandwidth of the paths is greater than or equal to M. The paths in the set S are then activated, i.e., TCP flows are started between the paths in order to drive an amount of traffic M through an edge E. The method then proceeds to step 622.

At a step 622, the total throughput achieved by all the TCP flows, i.e. the sum of the traffic rates of the TCP flows that were activated as identified in step 620 is measured. The total throughput is identified herein as "T". The method then proceeds to step 624.

At a step 624, an inquiry is made to determine if T<M. If true, the method proceeds to step 628. Otherwise, the method proceeds to step 630.

At a step 628, the edge E is marked with annotation "=T" indicating that such edge E has been saturated.

At a step 630, if T=M, then the edge E is still not saturated. If E was currently annotated as ">N", and N<M, then an edge E is marked with the annotation ">M".

In this manner, the methodology illustrated in FIG. 6B iterates over all edges with annotations of inequalities. When the method ends, an inquiry is made to determine if any annotation was refined. If true, steps 616 through 630 are iterated. Otherwise, the method terminates and delivers the current network annotation as an output.

The data acquisition unit 504 (FIG. 5) is capable of running the methodology illustrated in FIGS. 6A and 6B to intelligently orchestrate experiments between network endpoints to arrive at an annotated view of the network. As mentioned above, the end points have a plurality of agents running on them. The coordinator according to the present invention is capable of orchestrating some experiments between these end points to not only successfully find the view of the network between them but also find the complete annotated view.

FIG. 7 illustrates a methodology for detecting a bottleneck link in a network path illustrated in FIG. 1. The TCP protocol between a sender and receiver connected over a network path operates by increasing the rate (e.g., sending rate) at which data is sent from the sender to the receiver, thus probing for available bandwidth in the network. When the TCP protocol detects a packet loss, the sending rate is decreased and the probing process is repeated by increasing the sending rate. When the sending rate is increased, the delay experienced by packets at each link increases. However, the property of the bottleneck link on a path is that it shows the highest increase in delay. This delay can be measured by running the traceroute utility on the path together with the TCP flow as traceroute reports the per-hop delay experienced by packets. Thus, various aspects of the invention utilize traceroute and TCP in conjunction in order to infer the bottleneck link on a network path.

Thus, using the technique illustrated in FIG. 7, if a certain edge E in a network path is identified to be the bottleneck link, it is annotated with "=B" as it is realized that edge E is the constraining link in the end-to-end path and the bandwidth of the end-to-end path is B.

Figures 8, 9:
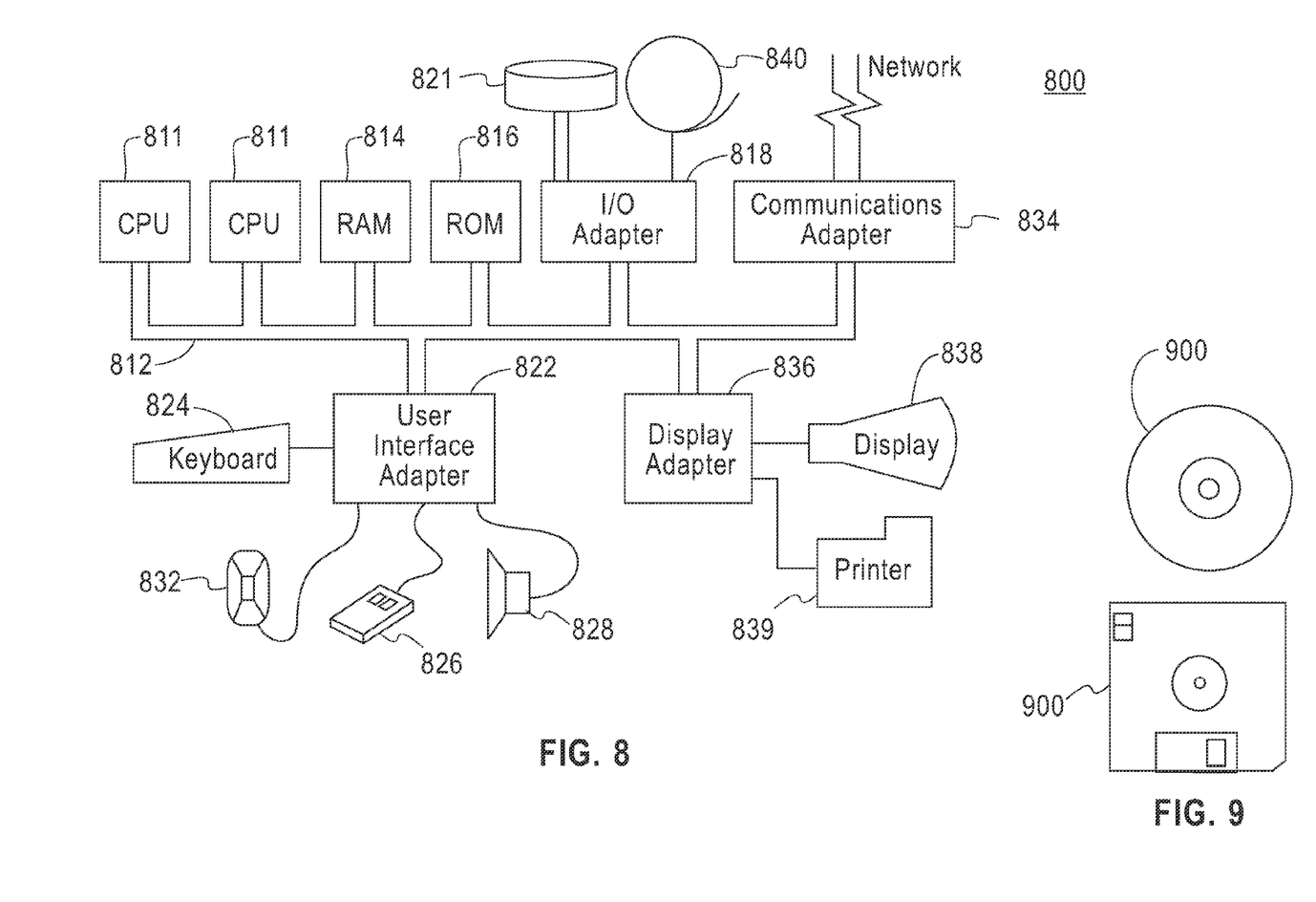
FIG. 8 illustrates an exemplary hardware/information handling system for generating a network path annotation service in accordance with an embodiment of the present invention.
FIG. 9 illustrates a signal bearing medium (e.g., storage medium) for storing information related to the method steps identified in FIGS. 6A and 6B.

FIG. 8 illustrates hardware configuration of an information handling/computer system for use with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer.

In addition to the hardware/software environment described above, a different aspect of the invention includes a computer-implemented method for performing the method described in accordance with an embodiment of the invention and described above with respect to FIGS. 6a-6B. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Figure 10:
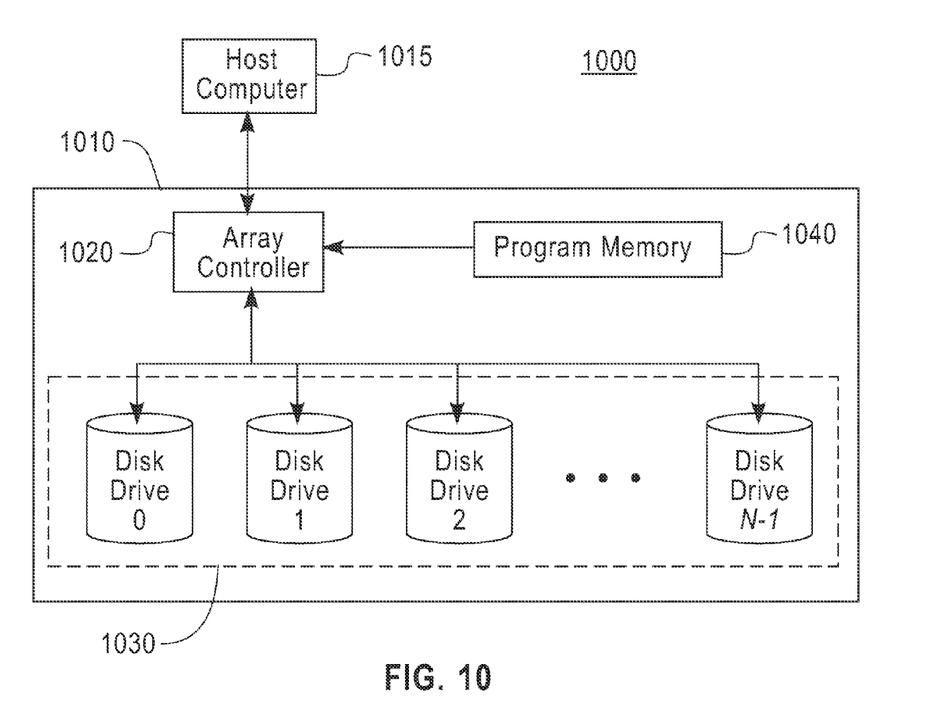
FIG. 10 illustrates an exemplary RAID array (e.g., storage medium) for storing program code configured to perform the methodology identified in FIGS. 6A and 6B.

This signal-bearing media may include, for example, a RAM contained within the CPU 811, as represented by the fast-access storage. Alternatively, instructions may be contained in another signal-bearing media, such as a magnetic data storage or CD-ROM diskette 900 (FIG. 9), directly or indirectly accessible by the CPU 811. Instructions may be stored on a variety of machine-readable data storage media, such as DASD storage (e.g., a conventional "hard drive" or a RAID array (e.g., 1000 in FIG. 10), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless.

In an illustrative embodiment of the invention, the machine-readable instructions may comprise software object code, compiled from a language such as, for example, "C", C++, etc. It will be appreciated that aspects of the invention should not be limited by the language used for creating such aspects.

Additionally, it should be recognized by one of ordinary skill in the art, after taking the present discussion as a whole, that the present invention can serve as a basis for a number of business or service activities. All of the potential service-related activities are intended as being covered by the present invention.

Network performance and availability contribute to the end-to-end performance and user experience of network applications and services. However, the distributed and decentralized nature of network resources makes performance management a difficult problem. The present invention provides a novel system and method for network monitoring which is capable of planning and adapting an application's network usage. For example, the present invention is capable of using knowledge of the performance of the underlying network connecting the end points of an application (i.e., network performance) and the availability of the network to plan and adapt an application's network usage.

By determining such information, decisions can be made regarding routing a client to a particular server (e.g., which network paths to take and/or servers to which the client should be directed, etc.) that has the best network connectivity, the most bandwidth, etc. Such determination can preferably be done without any support from the network infrastructure itself. This is advantageous because the provider of the service or application generally has no control over the network and probably has limited or no access to monitoring data of the network.

For example, network providers that are operating a network (e.g., telecommunications companies, such as AT&T, Sprint, etc.) have network management systems that internally monitor the performance of the network. However, the network providers only have network monitoring data for the parts of the network they own.

Moreover, this information is generally not available to the application. That is, it would be difficult for the application to access such information. Generally, monitoring data from network devices may not be available to applications running at the network endpoints.

Using the present invention multiple characteristics of the network or application can be captured. Exemplary characteristics to be captured include bandwidth (e.g., available bandwidth), latency, loss rates, etc. It is noted that bandwidth annotation and loss rate annotation are difficult and generally have not been addressed by the related art.

The exemplary aspects of the present invention provide an efficient annotation of network paths that determines the link bandwidths and bottlenecked links based on a network graph and a set of end-points. The annotation preferably is achieved in a Transmission Control Protocol-friendly (TCP-friendly) manner and preferably using limited probing iterations to determine the bottlenecks in a network path.

An advantage of the exemplary aspects of the present invention is that it is not intrusive in comparison to related art methods that use UDP-based probes to determine the network capacity. The annotation process does not change the dynamics of the existing flows because the procedure used preferably is based on TCP probes. TCP uses a control protocol to adjust its sending rate in response to network feedback, such that it shares the network fairly with the other flows active in the network. Hence, with a large number of active flows in the network, TCP causes a negligible impact on the sending rate of the other flows.

Aspects of the invention are capable of supporting available bandwidth queries on the network for simultaneous flows. For example, the present invention can support advanced queries like "determine the available bandwidth when node 1 sends to node 4 AND node 2 sends to node 10" which may be correctly answered by a system that does not consider the annotated network topology.

In one embodiment, sharing of paths can imply different answers for individual path queries and simultaneous multi-path query. The present invention also relates to a method or technique to identify bottlenecks in a network for a distributed networked application. Bottlenecks can be expressed as simultaneous multi-path queries.

While the invention has been described in terms of several exemplary embodiments, those skilled in the art will recognize that the invention can be practiced with modification within the spirit and scope of the appended claims. Further, it is noted that, Applicant's intent is to encompass equivalents of all claim elements, even if amended later during prosecution.

What is claimed is:

1. A method of generating an annotated network topology, the method comprising steps of:
    A) receiving a set of network endpoint addresses for a network as an input, wherein said network comprises a plurality of network paths, each network path connecting a pair of endpoints and comprising edges that connect said endpoints; wherein said endpoints comprise machines that connect to the network and use said network to communicate with other machines;
    B) deriving a network topology by performing a route tracing utility between each pair of endpoints to determine a route taken by packets;
    C) initially annotating each edge in the network with an initial value indicating that an available bandwidth for the edge has not yet been determined;
    D) performing transfer control flows between each pair of endpoints in order to determine the available bandwidth of each edge, wherein the available bandwidth is defined as an amount of bandwidth that an application can get by opening one or more transmission control protocol flows, wherein said performing step comprises:
        beginning at an innermost loop of the network topology, and using end to end network measurements over all network paths, measuring at least one of: bandwidth, latency, and loss rate;

probing the network path by saturating said network path with traffic such that received network traffic is less than transmitted network traffic when the transfer control protocol detects a packet loss;

identifying a delay in the network path as said path is saturated with network traffic;

monitoring the delay by performing a parallel route tracing utility on the network path together with the transfer control protocol flow as sais route tracing utility reports the delay, wherein the monitoring comprises:

computing a maximum flow of traffic for the network path with the delay;

determining a subset of the network paths that pass through the network path;

initiating transfer control protocol flows between the network paths in the subset;

determining a total throughput achieved by the transfer control protocol flows in the subset; and identifying a bottleneck as the network path with the total throughput that is less than the maximum flow;

E) annotating all edges in the network by changing the initial value to an annotated value, said annotating comprising:

annotating the network path identified as the bottleneck with an equality symbol;

annotating the network paths for which the available bandwidth has been determined with at least one selected from a group consisting of: maximum available bandwidth, latency, and loss rate;

annotating the network paths for which the available bandwidth has not been determined with an inequality symbol to indicate that said annotation can be further refined;

F) repeating the performing and the annotating steps until an annotated network topology of the network is obtained, such that an iteration over all edges does not change the annotation of any edge; and G) presenting the annotated network topology as output.

* * * * *